United States Patent
Kajiwara et al.

(10) Patent No.: US 12,433,987 B2
(45) Date of Patent: Oct. 7, 2025

(54) PHOTODYNAMIC THERAPY DEVICE

(71) Applicant: OTSUKA ELECTRONICS CO., LTD., Hirakata (JP)

(72) Inventors: Shinpei Kajiwara, Hirakata (JP); Fumito Kikuchi, Hirakata (JP)

(73) Assignee: OTSUKA ELECTRONICS CO., LTD., Hirakata (JP)

( * ) Notice: Subject to any disclaimer, the term of this patent is extended or adjusted under 35 U.S.C. 154(b) by 1079 days.

(21) Appl. No.: 17/433,792

(22) PCT Filed: Feb. 25, 2019

(86) PCT No.: PCT/JP2019/007128
§ 371 (c)(1),
(2) Date: Aug. 25, 2021

(87) PCT Pub. No.: WO2020/174547
PCT Pub. Date: Sep. 3, 2020

(65) Prior Publication Data
US 2022/0134126 A1 May 5, 2022

(51) Int. Cl.
*A61M 1/36* (2006.01)
*A61N 5/06* (2006.01)

(52) U.S. Cl.
CPC .......... *A61M 1/3683* (2014.02); *A61N 5/062* (2013.01); *A61M 2205/18* (2013.01); *A61N 2005/0628* (2013.01); *A61N 2005/0652* (2013.01)

(58) Field of Classification Search
CPC ............ A61M 1/3683; A61M 2205/18; A61M 1/36226; A61M 1/3681; A61N 5/062;
(Continued)

(56) References Cited

U.S. PATENT DOCUMENTS 5,702,432 A * 12/1997 Chen ...................... A61N 5/062
604/21
5,707,594 A 1/1998 Austin
(Continued)

FOREIGN PATENT DOCUMENTS

CN 102068723 A 5/2011
CN 106461780 A 2/2017
(Continued)

OTHER PUBLICATIONS

Extended European Search Report issued Sep. 9, 2022 in European Patent Application No. 19916662.0, 5 pages.
(Continued)

*Primary Examiner* — Jessica Arble
*Assistant Examiner* — Quynh Dao Le
(74) *Attorney, Agent, or Firm* — Oblon, McClelland, Maier &Neustadt, L.L.P.

(57) ABSTRACT

A photodynamic therapy device of this disclosure includes: a light emitting unit (112, 112) including light sources (110) each belonging to any one of groups; a photodetector (120X, 120Y) configured to output an electrical signal corresponding to an amount of light received from the light sources (110); a light emission control unit (160) configured to sequentially cause the light sources (110) to emit light for each group; and a computing unit (151) configured to calculate, based on a distance coefficient related to a distance between the photodetector (120X, 120Y) and the light sources (110) belonging to the each group, and on a value of the electrical signal output by the photodetector (120X, 120Y) in accordance with light emitted from the light sources belonging to the corresponding group, a group light amount value related to a light amount of the light sources belonging to the each group.

18 Claims, 6 Drawing Sheets

(58) Field of Classification Search
CPC .... A61N 2005/0628; A61N 2005/0652; A61N 5/06; A61N 2005/0629; A61N 2005/0632; A61N 2005/0635; A61N 2005/065; A61N 2005/0658; A61N 2005/0663; A61L 2/0011; A61L 2/11; A61L 2/0076; A61L 2/088; A61L 2/24; A61L 2/084; A61L 2202/14; A61L 2202/21; A61L 2202/22; A61L 2202/122; A61K 41/0057; A61K 41/0061
USPC ............... 604/4.01, 5.01, 6.08, 606, 2, 3
See application file for complete search history.

(56) References Cited

U.S. PATENT DOCUMENTS

| | | | | |
|---|---|---|---|---|
| 5,922,278 | A * | 7/1999 | Chapman | A61L 2/0011 250/455.11 |
| 6,219,584 | B1 * | 4/2001 | Lee | A61M 1/3696 436/523 |
| 6,565,802 | B1 | 5/2003 | Hanley et al. | |
| 7,025,877 | B1 | 4/2006 | de Gheldere et al. | |
| 7,459,695 | B2 * | 12/2008 | Hanley | A61L 2/084 422/42 |
| 10,463,873 | B1 * | 11/2019 | Yang | A61N 5/0603 |
| 2003/0030011 | A1 | 2/2003 | Brown et al. | |
| 2003/0035751 | A1 | 2/2003 | Hanley et al. | |
| 2003/0060747 | A1 | 3/2003 | Fries et al. | |
| 2003/0064001 | A1 | 4/2003 | Fries et al. | |
| 2003/0085173 | A1 | 5/2003 | deGheldere et al. | |
| 2003/0147770 | A1 | 8/2003 | Brown et al. | |
| 2003/0165398 | A1 | 9/2003 | Waldo et al. | |
| 2005/0258109 | A1 | 11/2005 | Hanley et al. | |
| 2006/0197031 | A1 | 9/2006 | de Gheldere et al. | |
| 2006/0221329 | A1 | 10/2006 | Waldo et al. | |
| 2006/0221330 | A1 | 10/2006 | Waldo et al. | |
| 2006/0257877 | A1 * | 11/2006 | Anderle | A61L 2/0052 435/6.18 |
| 2008/0060148 | A1 * | 3/2008 | Pinyayev | A61B 5/0088 15/4 |
| 2009/0010806 | A1 * | 1/2009 | Hlavinka | A61M 1/3683 422/82.05 |
| 2010/0161010 | A1 * | 6/2010 | Thomas | A61M 21/00 600/27 |
| 2012/0116373 | A1 | 5/2012 | Moench et al. | |
| 2012/0123322 | A1 * | 5/2012 | Scarpaci | G01V 8/20 250/573 |
| 2013/0237896 | A1 * | 9/2013 | Meibaum | A61M 1/3612 604/5.04 |
| 2013/0304019 | A1 | 11/2013 | Cooper et al. | |
| 2015/0359959 | A1 * | 12/2015 | Radwanski | A61M 1/3683 210/748.11 |
| 2016/0270851 | A1 | 9/2016 | Moench et al. | |
| 2016/0360966 | A1 * | 12/2016 | Ishii | G16C 10/00 |
| 2017/0010357 | A1 | 1/2017 | Lekås et al. | |
| 2017/0312537 | A1 | 11/2017 | Mori et al. | |
| 2020/0191652 | A1 | 6/2020 | Kasahara et al. | |
| 2022/0015438 | A1 * | 1/2022 | Bilat | G01F 22/00 |

FOREIGN PATENT DOCUMENTS

| | | |
|---|---|---|
| CN | 108434562 A | 8/2018 |
| JP | 2000-503579 A | 3/2000 |
| JP | 2003-501175 A | 1/2003 |
| JP | 2003-187482 A | 7/2003 |
| JP | 2004-533318 A | 11/2004 |
| JP | 2008-8849 A | 1/2008 |
| JP | 2012-533386 A | 12/2012 |
| JP | 2013-158717 A | 8/2013 |
| JP | 2018-65058 A | 4/2018 |
| WO | WO 00/74731 A1 | 12/2000 |
| WO | WO 2004/033081 A2 | 4/2004 |
| WO | WO 2011/090885 A2 | 7/2011 |
| WO | WO 2014/204001 A1 | 12/2014 |
| WO | WO 2015/162279 A1 | 10/2015 |
| WO | WO 2018/203495 A1 | 11/2018 |

OTHER PUBLICATIONS

International Search Report issued Apr. 9, 2019 in PCT/JP2019/007128 filed Feb. 25, 2019, 2 pages.
Combined Chinese Office Action and Search Report issue Jan. 20, 2024 in Chinese Patent Application No. 201980092950.2 (with partial translation), 8 pages.
Extended European Search Report issued Oct. 20, 2022 in European Patent Application No. 19917197.6, 5 pages.

* cited by examiner

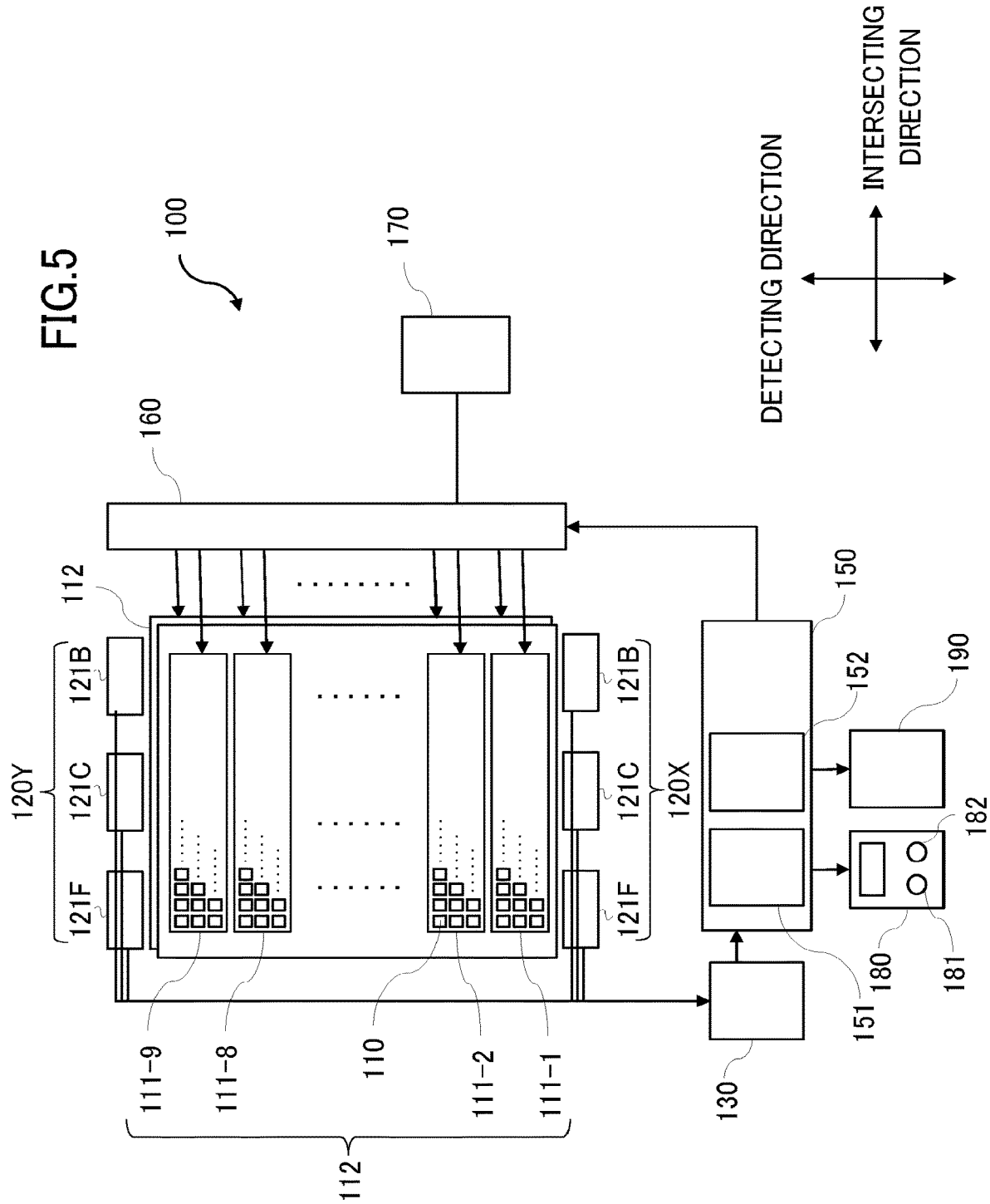

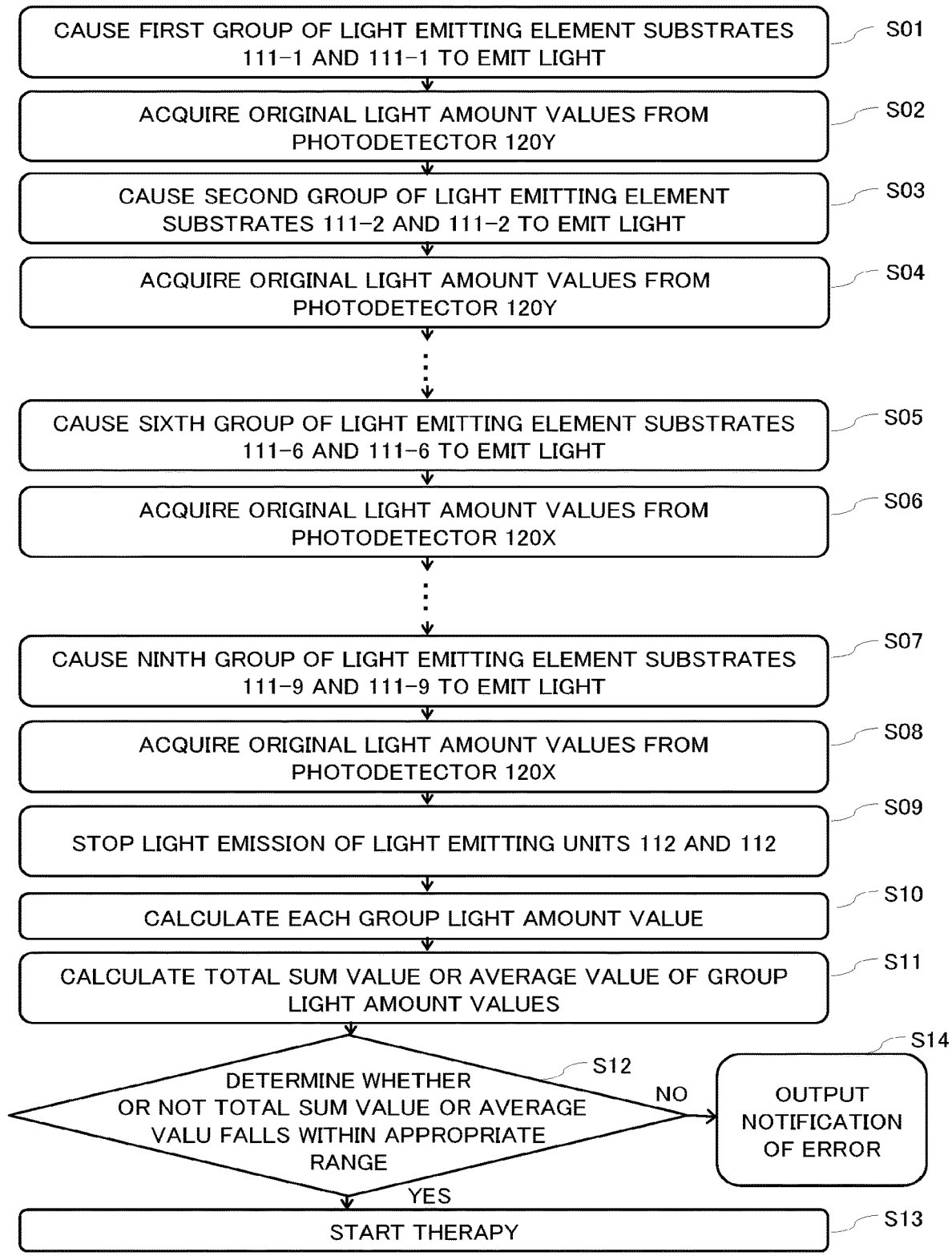

PHOTODYNAMIC THERAPY DEVICE

TECHNICAL FIELD

The present invention relates to a photodynamic therapy device.

BACKGROUND ART

In Patent Literature 1 below, there is disclosed a photodynamic therapy device including a plurality of LEDs, a photodetector, and a light intensity distribution control unit. The plurality of LEDs are arrayed in matrix, and are configured to emit light having a light emission peak at a specific wavelength for treating a patient. The photodetector is configured to detect a light intensity distribution of those plurality of LEDs. The light intensity distribution control unit is configured to determine a current by which each of the plurality of LEDs is driven so that the light intensity distribution detected by the photodetector falls within an appropriate range.

CITATION LIST

Patent Literature

[PTL 1] JP 2018-65058 A

SUMMARY OF INVENTION

Technical Problem

However, in the related-art photodynamic therapy device, in order to correctly detect a light amount of a light source formed by arraying light emitting elements in matrix, it is required to use, as the photodetector, optical sensors similarly arrayed in matrix, or to use a photodetector in which one optical sensor is scanned with respect to the light source. Thus, there has been a problem in that downsizing of the device is difficult.

This disclosure has been made in view of the above-mentioned circumstances, and has an object to achieve a compact photodynamic therapy device with which a light amount of a light source can be correctly detected by a limited number of photodetectors.

Solution to Problem

In order to solve the above-mentioned problem, according to this disclosure, there is provided a photodynamic therapy device, including: a light emitting unit including a plurality of light sources each belonging to any one of a plurality of groups; a photodetector configured to output an electrical signal corresponding to an amount of light received from one or more of the plurality of light sources; a light emission control unit configured to sequentially cause the plurality of light sources to emit light for each group; and a computing unit configured to calculate, based on a distance coefficient related to a distance between the photodetector and one or more of the plurality of light sources belonging to the each group, and on a value of the electrical signal output by the photodetector in accordance with light emitted from the one or more of the plurality of light sources belonging to the each group, a group light amount value related to a light amount of the one or more of the light sources belonging to the each group.

BRIEF DESCRIPTION OF DRAWINGS

FIG. 5 is a circuit block diagram of the photodynamic therapy device according to the embodiment.

FIG. 6 is a flow chart for illustrating an example of a method of controlling the photodynamic therapy device according to the embodiment.

DESCRIPTION OF EMBODIMENTS

An embodiment in this disclosure is described below with reference to the drawings.

Figure 1:
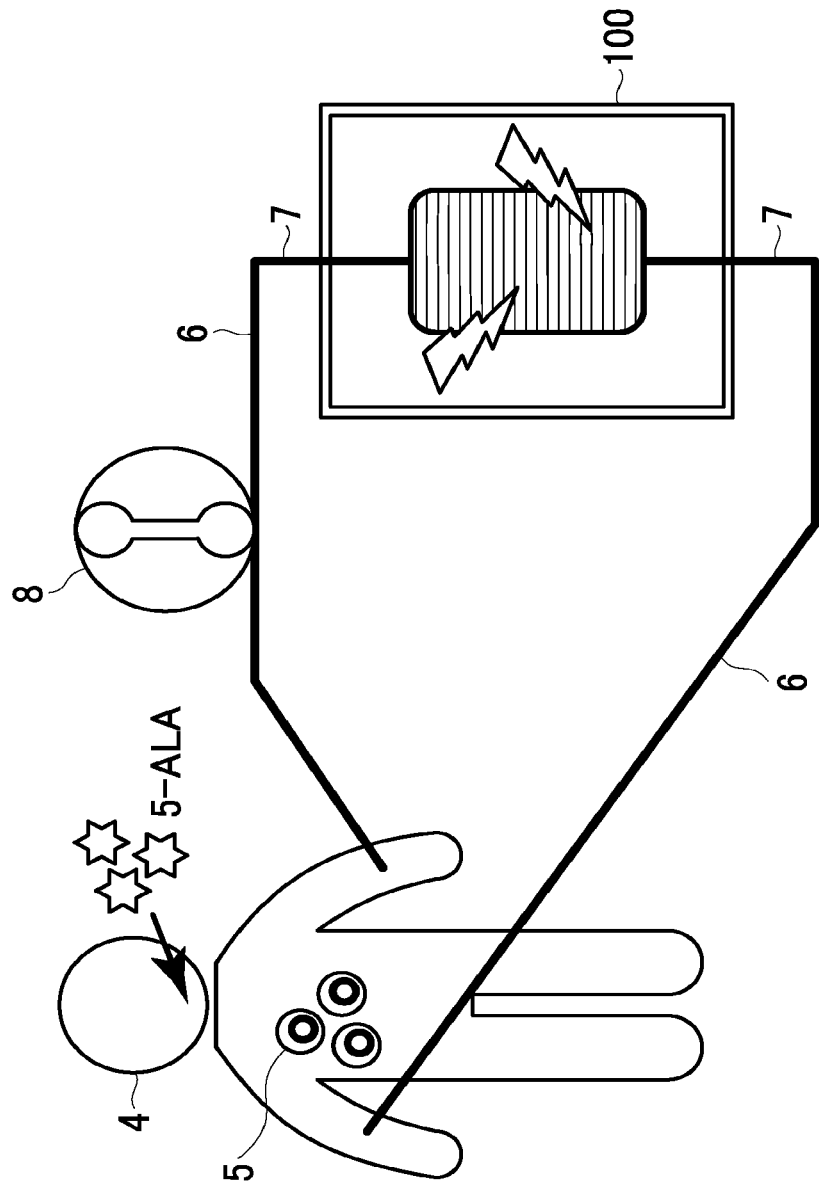
FIG. 1 is a schematic diagram for illustrating an outline of photodynamic therapy according to an embodiment.

FIG. 1 is a schematic diagram for illustrating an outline of a photodynamic therapy according to this embodiment. In an example illustrated in FIG. 1, a patient 4 is a blood cancer patient, and has tumor cells 5. After 5-aminolevulinic acid (5-ALA) having oral absorbability is administered to the patient 4, 5-aminolevulinic acid is metabolized into protoporphyrin IX (PpIX), which is a photosensitive substance, in a biosynthetic process of heme in intercellular mitochondria. Protoporphyrin IX has a characteristic of accumulating in mitochondria in a tumor cell-specific manner, and thus accumulates in the tumor cells 5 of the patient 4.

Circulatory organs of the patient 4 are connected to a photodynamic therapy device 100 according to this embodiment via a blood circuit 6 and an irradiation blood circuit 7. Blood of the patient 4 contains the tumor cells 5 in which protoporphyrin IX has accumulated. The blood is caused to flow into the photodynamic therapy device 100 according to this disclosure via the blood circuit 6 and the irradiation blood circuit 7 by an action of an extracorporeal circulation pump 8 connected to the blood circuit 6. When the blood is irradiated with light having a wavelength falling within a wavelength range absorbable in protoporphyrin IX (for example, about 410 nm and in a range of from about 500 nm to 650 nm) in the photodynamic therapy device 100, protoporphyrin IX contained in the blood is brought into an excited singlet state. Protoporphyrin IX returns from the excited singlet state to a ground state through an excited triplet state. Oxygen, which has absorbed energy generated through the above-mentioned process, produces singlet oxygen that can destroy or affect the tumor cells 5 in the blood.

The blood irradiated with the light is returned to the circulatory organs of the patient 4 via the irradiation blood circuit 7 and the blood circuit 6 by an action of the extracorporeal circulation pump 8.

In the example described above, protoporphyrin IX is used as an example of the photosensitive substance. However, the photosensitive substance according to this disclosure is not limited to protoporphyrin IX. Further, in the example described above, the patient 4 is a blood cancer patient and has the tumor cells 5. However, a target according to this disclosure is not limited to the tumor cells 5. Any undesirable component in blood, in which the photosensitive substance accumulates, may be the target according to this disclosure.

Figure 2:
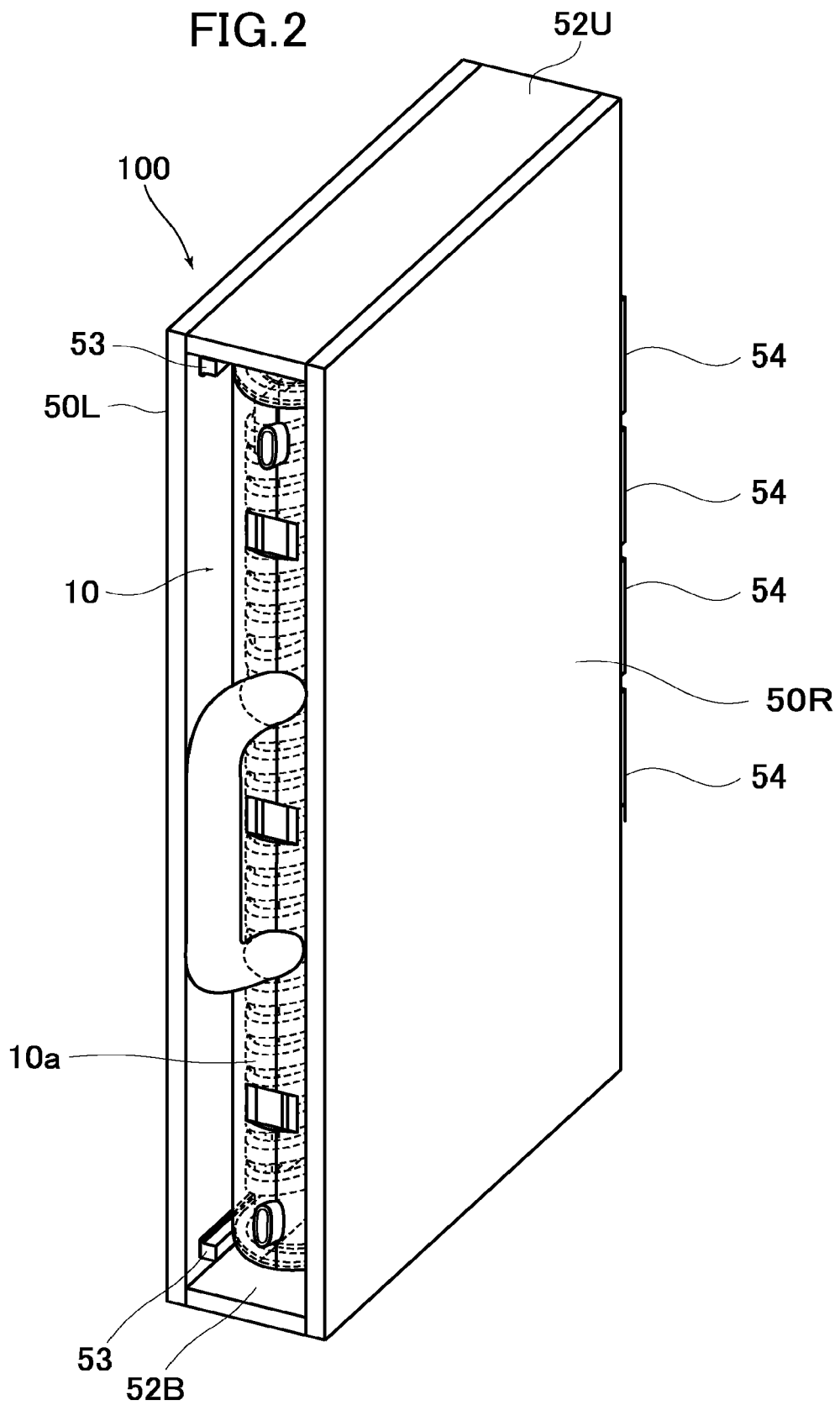
FIG. 2 is an outside perspective view of a main body of a photodynamic therapy device according to the embodiment.

FIG. 2 is an outside perspective view for illustrating a main body of the photodynamic therapy device 100 according to this embodiment. As illustrated in FIG. 2, the main body of the photodynamic therapy device 100 according to this embodiment includes a cartridge 10 and a casing 50 configured to accommodate the cartridge 10. The casing 50 has a thin box like shape and includes light emitting units including LED light sources in an inner surface. The casing 50 includes a left side plate 50L and a right side plate 50R opposed to each other. An opening formed on the front side of the casing 50 is closed with a lid (not shown) so that light leakage is prevented. An upper portion of the casing 50 is covered with an upper plate 52U, and a lower portion thereof is covered with a bottom plate 52B. Further, the rear side is covered with a back plate (not shown). A plurality of fans 54 are provided on the back plate so that heat generated from the above-mentioned light emitting units can be forcibly discharged to the outside. An intake port may be provided in the lid provided over the opening on the front side. The cartridge 10 includes a cover 10a. This cover 10a is formed of a light transmissive member, and includes a handle on the front side.

Figure 3:
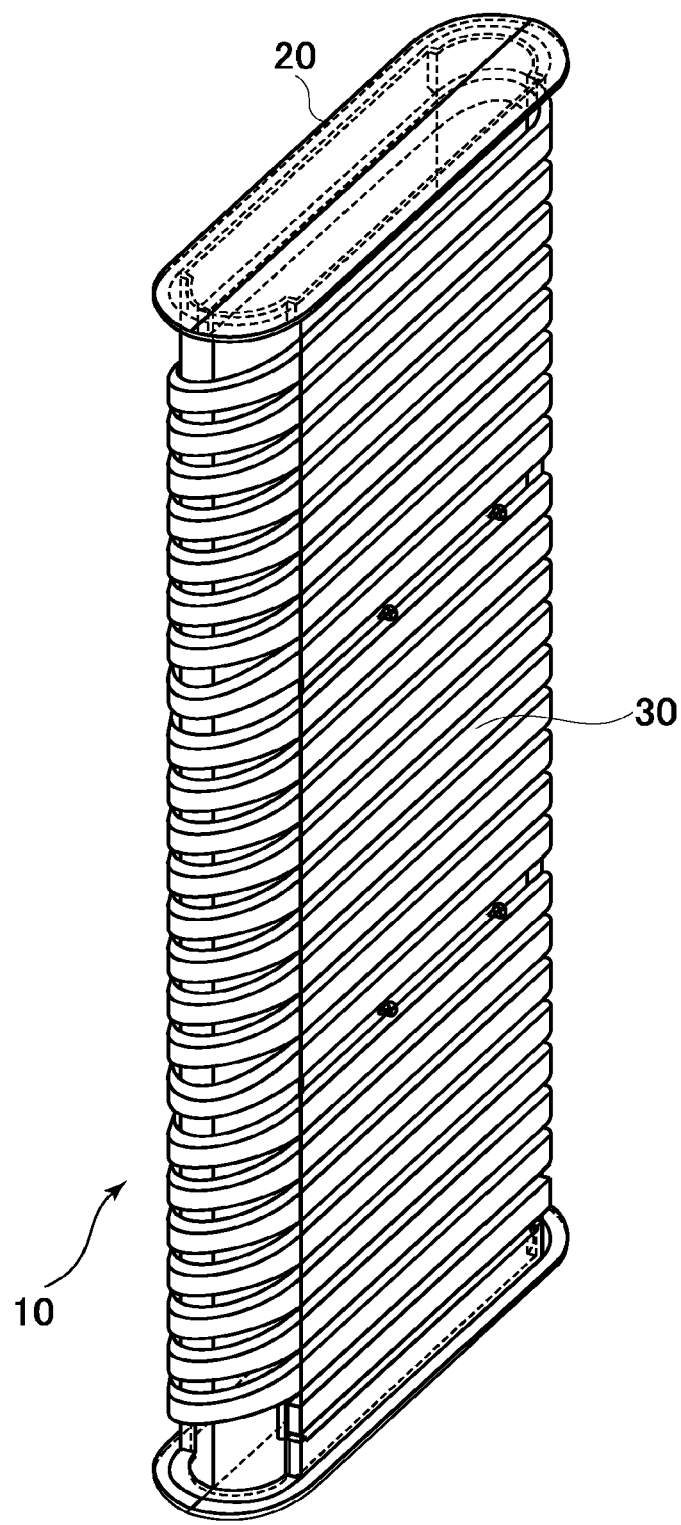
FIG. 3 is a perspective view for illustrating internal structure of a cartridge according to the embodiment.

FIG. 3 is an outside perspective view for illustrating internal structure of the cartridge 10 in this embodiment. FIG. 3 shows the cartridge 10 with the cover 10a being removed. As illustrated in FIG. 3, the cartridge 10 includes a winding core 20 and a tube 30. The winding core 20 has a hollow tubular shape, and includes right and left flat surfaces which are opposed to each other. The tube 30 is arranged so as to be wound around side surfaces of the winding core 20. The winding core 20 and the tube 30 are both made of a light transmissive material. The cartridge 10 is accommodated inside the casing 50 so that a left side surface thereof is opposed to an inner surface of the left side plate 50L of the casing 50 and a right side surface thereof is opposed to an inner surface of the right side plate 50R of the casing 50. In this manner, light emitted from the above-mentioned light emitting units is efficiently received by both the right and left surfaces. The cartridge 10 is single use for each patient. Further, the photodynamic therapy device 100 includes, in addition to the main body illustrated in FIG. 3, a control unit 150 illustrated in FIG. 5, and the like.

Figure 4:
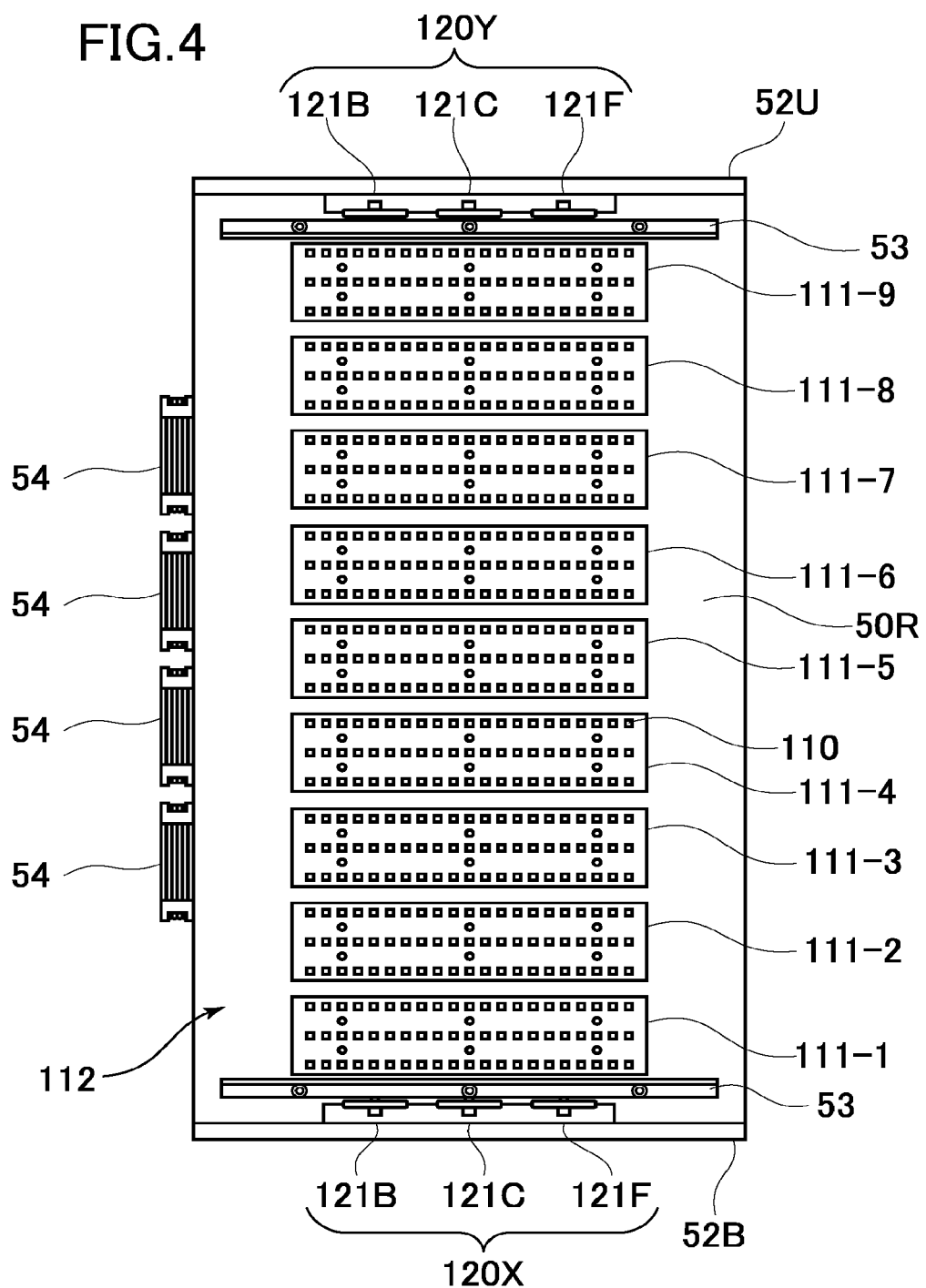
FIG. 4 is a left side view for illustrating internal structure of a casing with a left side plate being omitted.

FIG. 4 is a left side view of the casing 50. In this case, the left side plate 5OL is removed in order to show the internal structure of the casing 50. As illustrated in FIG. 4, a photodetector 120X is mounted on an upper surface of the bottom plate 52B of the casing 50, and a photodetector 120Y is also mounted on a lower surface of the upper plate 52U. The photodetector 120X includes photodetection elements 121B, 121C, and 121F, and those photodetection elements 121B, 121C, and 121F are arranged side by side in the stated order from the depth side of the casing 50, on a line located at a center between the right and left sides of the casing 50. Further, a distance between the photodetection element 121B and the photodetection element 121C is equal to a distance between the photodetection element 121F and the photodetection element 121C. Further, the photodetection elements 121B, 121C, and 121F are all mounted so that their light detecting directions are directed vertically upward.

The photodetector 120Y similarly includes photodetection elements 121B, 121C, and 121F. Those photodetection elements 121B, 121C, and 121F are arranged side by side in the stated order from the depth side of the casing 50, on a line located at the center between the right and left sides of the casing 50. Further, a distance between the photodetection element 121B and the photodetection element 121C is equal to a distance between the photodetection element 121F and the photodetection element 121C. Further, the photodetection elements 121B, 121C, and 121F are all mounted so that their light detecting directions are directed vertically downward. Further, the photodetection element 121B of the photodetector 120X is located in a detecting direction, that is, on a front side of the photodetection element 121B of the photodetector 120Y. Similarly, the photodetection element 121C of the photodetector 120X is located in a detecting direction, that is, on a front side of the photodetection element 121C of the photodetector 120Y, and the photodetection element 121F of the photodetector 120X is located in a detecting direction, that is, on a front side of the photodetection element 121F of the photodetector 120Y. That is, the photodetection elements 121B face each other, the photodetection elements 121C face each other, and the photodetection elements 121F face each other.

On the inner surface of the right side plate 50R of the casing 50, light emitting element substrates 111-1 to 111-9 are arrayed in the stated order from the bottom to the top in the detecting direction of each of the photodetectors 120X and 120Y, that is, in an up-and-down direction of FIG. 4. Those light emitting element substrates 111-1 to 111-9 form a light emitting unit 112. The light emitting element substrates 111 each have a horizontally-long rectangular flat-plate shape, and all have the same shape and the same structure. The light emitting element substrates 111 are mounted on the right side plate 50R so that a longitudinal direction of each of the light emitting element substrates 111 matches a front-and-rear direction of the casing 50 and further a front surface thereof faces inward of the casing 50. On the front surface of each of the light emitting element substrates 111, a plurality of light sources 110 (in this case, single LED elements each being a light emitting element) are mounted in matrix. Specifically, a large number of light sources 110 are mounted so as to form a plurality of rows (in FIG. 4, three rows) in the detecting direction of each of the photodetectors 120X and 120Y and a plurality of columns (in FIG. 4, twenty-one columns) in an intersecting direction orthogonal to the same detecting direction. Further, a light emitting direction of each light source 110 is perpendicular to the front surface of the light emitting element substrate 111, and is directed toward the cartridge 10. Each light source 110 is formed of an LED light emitting element and a condensing element (condensing lens) covering the light emitting part. The intensity of light to be emitted is maximum in a direction perpendicular to the front surface of the light emitting element substrate 111, which is a front direction of the condensing element, and the intensity is decreased as deviating from this direction. Each light source 110 is not required to include the condensing element. Further, in each light emitting element substrate 111, the light sources 110 mounted on the corresponding light emitting element substrate 111 are arranged symmetrically with respect to a longitudinal center line. For example, in FIG. 4, the light sources 110 in the eleventh row are arranged on the longitudinal center line of the light emitting element substrate 111.

The light emitting element substrates 111-1 to 111-9 are arranged at equal intervals in the up-and-down direction. Further, positions in the front-and-rear direction of all of the light emitting element substrates 111-1 to 111-9 are aligned with respect to the right side plate 50R. Further, all longitudinal center lines of the light emitting element substrates 111-1 to 111-9 match a line connecting between the photodetection elements 121C and 121C described above (line extending in the detecting direction).

Further, a distance between the photodetector 120X and the light emitting element substrate 111-1 is equal to a distance between the photodetector 120Y and the light emitting element substrate 111-9. Further, a distance between the photodetection element 121B and the photodetection element 121C and a distance between the photodetection element 121F and the photodetection element 121C are each, for example, little more than ¼ of a width in a direction of the row of the light sources 110 mounted on each light emitting element substrate 111. Light of the light sources 110 provided closer to a front end in a row direction mainly enters the photodetection element 121F, and light of the light sources 110 provided closer to a rear end in the row direction mainly enters the photodetection element 121B. Light of the light sources 110 provided in the vicinity of the center in the row direction mainly enters the photodetection element 121C.

Also on the left side plate 50L, similarly, another light emitting unit 112 is provided. A relative position of this light emitting unit 112 with respect to the photodetectors 120X and 120Y is the same as that of the light emitting unit 112 of the right side plate 50L. As described later, in this embodiment, the light sources 110 mounted on the right and left light emitting element substrates 111 and 111 arranged at the same height form one group, and in a light amount check mode, the right and left light emitting units 112 control the light sources 110 to emit light for each group. That is, when a light emitting element substrate 111-n of the left side plate 50L is turned on, a light emitting element substrate 111-n of the right side plate 50R is also turned on so that light emitted from both substrates is simultaneously received by the photodetector 120X or 120Y. In the following, the light sources 110 mounted on the light emitting element substrates 111 at the same height of the right and left light emitting units 112 are referred to as "light sources 110 belonging to a group," and the light emitting element substrates 111 at the same height are sometimes expressed as "group of light emitting element substrates 111."

Guide rails 53 extending in the front-and-rear direction are provided at upper and lower end portions of the left side plate 50L and upper and lower end portions of the right side plate 50R. The cartridge 10 is inserted into the casing 50 along the guide rails 53. As a result, the left side surface of the cartridge 10 is opposed to the light emitting unit 112 provided on the inner surface of the left side plate 50L of the casing 50, and the right side surface of the cartridge 10 is opposed to the light emitting unit 112 provided on the inner surface of the right side plate 50R of the casing 50. In this manner, blood flowing through the tube 30 illustrated in FIG. 3 is efficiently irradiated with light. The blood contains a photosensitive substance. As described above, singlet oxygen is produced through irradiation of light from the light emitting units 112, thereby being capable of breaking down or affecting an undesired component in the blood.

FIG. 5 is a circuit block diagram of the photodynamic therapy device 100 of this embodiment. As illustrated in FIG. 5, the photodynamic therapy device 100 of this embodiment includes the above-mentioned light emitting units 112 and 112, the above-mentioned photodetectors 120X and 120Y, and the control unit 150. The photodynamic therapy device 100 further includes a power supply device 170, a display device 180, and a speaker 190.

The photodetectors 120X and 120Y each include the photodetection elements 121F, 121C, and 121B, and those detection elements each receive light emitted from the light sources 110 to output an electrical signal corresponding to an amount of the received light. The electrical signal is, for example, an analog voltage signal, and the photodetection elements 121F, 121C, and 121B each output a higher voltage as the amount of the received light is increased. The electrical signal output as described above is input to an A/D conversion circuit 130, and the A/D conversion circuit 130 converts those signals into digital values. Those digital values are input to the control unit 150. This digital value is hereinafter referred to as "original light amount value."

The control unit 150 includes a CPU 151 and a memory 152, and has a function as a computer. The CPU 151 controls each unit of the photodynamic therapy device 100 in accordance with a built-in program, and functions as a "computing unit" in this disclosure to perform computation of a group light amount value, a total light amount value, and the like, as described later. The control unit 150 is connected to a light emission control unit 160 having a built-in switching circuit. The control unit 150 transmits a command to the light emission control unit 160 in accordance with the built-in program to cause the light sources 110 of each of the light emitting units 112 and 112 to emit light. Specifically, in a therapy mode, all of the light sources 110 of the light emitting units 112 and 112 are turned on. Further, in the light amount check mode, the light sources 110 of each of the light emitting units 112 and 112 are sequentially caused to emit light for each group. In the light amount check mode, every time the light emitting element substrates 111 of the respective light emitting units 112 are turned on, a digital value indicating an amount of light emitted from those light emitting element substrates 111, that is, an original received-light value is stored in the memory 152. In addition, the memory 152 stores the built-in program or secures a work area for the CPU 151. The built-in program may be installed by, for example, a communication unit (not shown) through connection with a personal computer, or may be installed from an external storage medium, for example, a semiconductor memory.

The light emission control unit 160 supplies, in accordance with the command transmitted from the control unit 150, a power supply voltage supplied from the power supply device 170, to the light emitting units 112 and 112. Particularly in the light amount check mode, the light emission control unit 160 selectively supplies the power supply voltage to any one of the light emitting element substrates 111-1 to 111-9 in each of the light emitting units 112 and 112. For example, when switching timing is received from the control unit 150 as the above-mentioned command, the power supply voltage is supplied to the light emitting element substrates 111-1 to 111-9 in an order determined in advance. As another example, when designation of any one of the light emitting element substrates 111-1 to 111-9 is received from the control unit 150 as the above-mentioned command, the power supply voltage is supplied to the designated light emitting element substrate 111. The light emission control unit 160 may adjust, in the therapy mode, the light amount of the light emitting element substrate 111 designated by the command, in accordance with the command from the control unit 150. For example, the light amount can be adjusted by changing, when the power supply voltage is supplied to each light emitting element substrate 111, a duty ratio of the power supply voltage. The command from the control unit 150 includes an analog command signal, and the light amount can be adjusted by changing a current by which the light emitting elements are turned on in proportional to the analog signal.

In the light amount check mode, when the light emitting element substrates 111 selected in the respective light emitting units 112 are turned on in accordance with the command transmitted from the control unit 150, the control unit 150 stores, in the memory 152, the original received-light value of one of the photodetectors 120X and 120Y associated in advance with those selected light emitting element substrates 111 and 111. On each light emitting element substrate 111, the light sources 110 are arrayed also in the intersecting direction, and a light receiving sensitivity of each of the photodetection elements 121F, 121C, and 121B included in each of the photodetectors 120X and 120Y has an angle characteristic in which the light receiving sensitivity is maximum in the front direction. That is, the light receiving sensitivity is maximum in the front direction, and the light receiving sensitivity is decreased as deviating from the same front direction. In view of the above, in this embodiment, in particular, each light emitting element substrate 111 is associated with one of the photodetectors 120X and 120Y farther therefrom. Specifically, the light emitting element substrates 111-1 to 111-4 are associated with the photodetector 120Y, and the light emitting element substrates 111-6 to 111-9 are associated with the photodetector 120X. The light emitting element substrate 111-5 is located at equal distances from the photodetectors 120X and 120Y, and hence the light emitting element substrate 111-5 may be associated with any one of the photodetectors 120X and 120Y. In this case, as an example, the light emitting element substrate 111-5 is associated with the photodetector 120Y. In this manner, each light source 110 mounted on the light emitting element substrate 111 is brought closer to the detecting direction of each of the photodetection elements 121F, 121C, and 121B (direction at the maximum light receiving sensitivity, that is, the front direction), and thus the light emitted from each light source 110 is detected at a higher sensitivity by each of the photodetection elements 121F, 121C, and 121B. As a result, the photodetectors 120X and 120Y can accurately detect the increase and decrease of the light amount of each light source 110.

Further, as described above, the light sources 110 are arrayed also in the intersecting direction on each light emitting element substrate 111. With only one photodetection element 121C, it is not always possible to sufficiently detect light emitted from all of the light sources 110 mounted on each light emitting element substrate 111. In view of the above, each of the photodetectors 120X and 120Y includes not only the photodetection element 121C, but also the photodetection elements 121F and 121B provided so as to be spaced apart from each other in the above-mentioned intersecting direction. Those photodetection elements 121F and 121B are capable of receiving, as compared to the photodetection element 121C, a larger amount of light of the light sources 110 mounted at end portions in the intersecting direction on each light emitting element substrate 111. In this embodiment, the original received-light values obtained by the photodetection element 121F, the photodetection element 121C, and the photodetection element 121B are subjected to weighted combining so that a value indicating a light amount from the light sources 110 belonging to the same group, that is, an original group light amount value is calculated. In this manner, there can be obtained an original group light amount value sufficiently reflecting the amount of light emitted from all of the light sources 110 mounted on the same group of light emitting element substrates 111 and 111.

In this case, a relative angle of a unit of light sources 110 belonging to the same group with respect to, as a reference, the detecting direction (front direction) of the photodetection element 121F is different from a relative angle of a unit of light sources 110 belonging to the same group with respect to, as a reference, the detecting direction of the photodetection element 121C. The reason is because the photodetection element 121C is arranged at the center in the intersecting direction corresponding to an array direction of the light sources 110 mounted on the same group of light emitting element substrates 111, but the photodetection element 121F is arranged closer to one side in the intersecting direction. Similarly, a relative angle of a unit of light sources 110 belonging to the same group with respect to, as a reference, the detecting direction (front direction) of the photodetection element 121B is different from a relative angle of a unit of light sources 110 belonging to the same group with respect to, as a reference, the detecting direction (front direction) of the photodetection element 121C. Accordingly, regarding light emitted from the light sources 110 belonging to the same group, the number of light sources 110 from which the photodetection element 121C can sufficiently receive the light is different from the number of light sources 110 from which the photodetection element 121F or the photodetection element 121B can sufficiently receive the light.

In view of the above, in this embodiment, in order to normalize the original light amount value obtained from each of the photodetection elements 121F, 121C, and 121B, there is set in advance a coefficient, that is, a relative angle coefficient $\beta$ corresponding to a relative angle of a unit of light sources 110 belonging to the same group with respect to, as the reference, the detecting direction of each of the photodetection elements 121F, 121C, and 121B. In this case, the relative angle coefficient $\beta$ of the photodetection element 121C is always 1. The reason is because all of the light emitting element substrates 111 are always located on the front side of the photodetection element 121C. Meanwhile, the relative angle coefficient $\beta$ of each of the photodetection elements 121F and 121B is always a value larger than 1. The reason is because the photodetection elements 121F and 121B can perform highly sensitive light reception of only light of a smaller number of light sources 110 as compared to the photodetection element 121C.

In this case, the relative angle coefficients $\beta$ of the photodetection elements 121F and 121B may have the same value. The reason is because the relative angles of the group of light sources 110 being a light detection target with respect to the detecting directions of the photodetection elements 121F and 121B are the same, and the numbers of light sources 110 from which the photodetection elements 121F and 121B can sufficiently receive light are the same.

The relative angle coefficients $\beta$ of the photodetection elements 121F and 121B vary depending on the positions of the light emitting element substrates 111 and 111 being light emission sources when the photodetection elements 121F and 121B detect the light amounts. That is, when the photodetectors 120X and 120Y detect light emitted from a closer group of light emitting element substrates 111 and 111, the values of the relative angle coefficients $\beta$ of the photodetection elements 121F and 121B are relatively significantly away from 1. In contrast, when the photodetectors 120X and 120Y detect light emitted from a farther group of light emitting element substrates 111, the values of the relative angle coefficients 13 of the photodetection elements 121F and 121B come close to 1. The reason is because, as the light emitting element substrates 111 and 111 are farther, a difference in relative angle from the photodetection element 121C is decreased, and the number of light sources 110 from which the photodetection element 121F or the photodetection element 121B can sufficiently receive light comes close to the number of light sources 110 from which the photodetection element 121C can sufficiently receive light. In view of the above, the control unit 150 stores, in advance, for example, the relative angle coefficients $\beta$ of the photodetection elements 121F and 121B in association with the positions of the light emitting element substrates 111 and 111, that is, the position (height) of the group.

The value of the relative angle coefficient β can be obtained by mounting normal light sources 110 (whose light amount satisfies the reference) on all of the light emitting element substrates 111, and measuring light emitted from each group of light emitting element substrates 111 through use of the photodetector 120X or 120Y in advance. For example, the light sources 110 of each group of light emitting element substrates 111 and 111 are caused to emit light, and the original light amount value is acquired by each of the photodetection element 121C and the photodetection element 121F. Then, a ratio of the original light amount value obtained by the photodetection element 121F to the original light amount value obtained by the photodetection element 121C may be set as the relative angle coefficient corresponding to the positions of the light emitting element substrates 111.

When a certain group of light emitting element substrates 111 and 111 emits light and the original light amount value thereof is obtained by each of the photodetection elements 121F, 121C, and 121B, the control unit 150 reads out the relative angle coefficient β associated with the position of the group from the memory 152. Then, the control unit 150 multiples the original light amount value obtained by each of the photodetection elements 121F and 121B by the read-out relative angle coefficient R. In this manner, the normalized light amount values are obtained for the photodetection elements 121F and 121B. Further, the control unit 150 calculates a sum or an average value of those normalized light amount values and the original light amount value from the photodetection element 121C, and sets this value as the original group light amount value. This original group light amount value is a value indicating a magnitude of an amount of light emitted from all of the light sources 110 mounted on the same group of light emitting element substrates 111 and 111.

Through use of the relative angle coefficient β described above, the original light amount values from the photodetection elements 121F, 121C, and 121B are subjected to weighted combining so that the original group light amount value of each group is calculated. In this manner, even when light amount reduction occurs in a part of the light sources 110 arranged side by side in the intersecting direction, the control unit 150 can appropriately detect the reduction.

Distances from the light emitting element substrates 111-1 to 111-5 to the photodetector 120Y are different from each other. Specifically, the light emitting element substrate 111-1 is farthest from the photodetector 120Y, and the light emitting element substrate 111-5 is closest to the photodetector 120Y. Similarly, distances from the light emitting element substrates 111-6 to 111-9 to the photodetector 120X are different from each other. Thus, as the distance to the light emitting element substrate 111 is increased, the original group light amount value calculated based on the original light amount value obtained by the photodetector 120X or 120Y is decreased. In view of the above, in this embodiment, in order to normalize the original group light amount value, there is used a distance coefficient α related to the distance from the photodetector 120X to each of the light emitting element substrates 111-6 to 111-9 and the distance from the photodetector 120Y to each of the light emitting element substrates 111-1 to 111-5. The value of the distance coefficient α is increased as the distance from the photodetector 120X or 120Y to the light emitting element substrate 111 is increased.

The distance coefficient α can be obtained by mounting normal light sources 110 (whose light amount satisfies the reference) on all of the light emitting element substrates 111, and measuring a light amount of each group of light emitting element substrates 111 through use of the photodetector 120X or 120Y in advance. For example, the light sources 110 of each group of light emitting element substrates 111 and 111 are caused to emit light, and the original group light amount value of each group is calculated as described above. Then, a ratio of the original group light amount value of one group to the original group light amount value of a different specific group may be set as the distance coefficient α of the each group. For example, when the light emitting element substrates 111-1 and 111-1 farthest from the photodetector 120Y are selected as the specific group, the distance coefficient α of the specific group is 1, and the distance coefficients α of other groups have values smaller than 1.

The distance coefficients α obtained as described above are stored in the memory 152 in association with the groups. The distance coefficient α to be applied when the photodetector 120Y detects the light amount of the light emitting element substrates 111-1 and 111-1 is equal to the distance coefficient α to be applied when the photodetector 120X detects the light amount of the light emitting element substrates 111-9 and 111-9. The reason is because the distance between the photodetector 120Y and each of the light emitting element substrates 111-1 and 111-1 is equal to the distance between the photodetector 120X and each of the light emitting element substrates 111-9 and 111-9. Similarly, when the photodetector 120X and the photodetector 120Y detect light emitted from a group of light emitting element substrates 111 at equal distances therefrom, the same distance coefficient α is applied. In view of the above, the distance coefficients α to be stored in the memory 152 may be partially omitted in accordance with the relative position between each of the photodetectors 120X and 120Y and each light emitting element substrate 111.

The control unit 150 multiplies the original group light amount value of each group by the distance coefficient α of the corresponding group, to thereby obtain the normalized group light amount value. The control unit 150 calculates a total sum or an average value of the normalized group light amount values, to thereby calculate a light amount value of the entire light emitting units 112 and 112, that is, a total light amount value. Through use of this total light amount value, the control unit 150 determines whether or not the light emitting units 112 and 112 emit light at an appropriate light amount.

FIG. 6 is a flow chart for illustrating an example of a method of controlling the photodynamic therapy device 100 according to this embodiment. In FIG. 6, the photodynamic therapy device 100 is operated in the light amount check mode, and is then operated in the therapy mode in accordance with the result of the light amount check mode. First, the CPU 151 of the control unit 150 starts the operation of the light amount check mode, and uses the light emission control unit 160 to selectively cause a first group of light emitting element substrates 111-1 and 111-1 to emit light (Step S01). Subsequently, the CPU 151 acquires original light amount values by the photodetector 120Y and the A/D conversion circuit 130, and temporarily stores the original light amount values in the memory 152 in association with the first group. In this case, a total of three original light amount values obtained from the photodetection element 121F and the photodetection elements 121C and 121B are temporarily stored (Step S02). Next, the CPU 151 causes a second group of light emitting element substrates 111-2 and 111-2 to emit light (Step S03). Subsequently, the CPU 151 acquires three original light amount values by the photodetector 120Y and the A/D conversion circuit 130, and temporarily stores the original light amount values in the memory 152 in association with the second group (Step S04). After that, similarly, the CPU 151 sequentially causes groups from a third group of light emitting element substrates 111-3 and 111-3 to a fifth group of light emitting element substrates 111-5 and 111-5 to emit light in the same manner, and temporarily stores three original light amount values in the memory 152 in association with each group.

Next, the CPU 151 of the control unit 150 uses the light emission control unit 160 to selectively cause a sixth group of light emitting element substrates 111-6 and 111-6 to emit light (Step S05). Subsequently, the CPU 151 acquires three original light amount values by the photodetector 120X and the A/D conversion circuit 130, and temporarily stores the original light amount values in the memory 152 in association with the sixth group (Step S06). After that, similarly, the CPU 151 sequentially causes a seventh group of light emitting element substrates 111-7 and 111-7 and an eighth group of light emitting element substrates 111-8 and 111-8 to emit light, and temporarily stores three original light amount values in the memory 152 in association with each group. Finally, the CPU 151 causes a ninth group of light emitting element substrates 111-9 and 111-9 to emit light (Step S07). Then, the CPU 151 acquires three original light amount values by the photodetector 120X and the A/D conversion circuit 130, and temporarily stores the original light amount values in the memory 152 in association with the ninth group (Step S08). Then, the CPU 151 transmits a stop command to the light emission control unit 160 so that the light emission of the light emitting units 112 and 112 is stopped (Step S09). The CPU 151 corresponding to the computing unit reads out the three original light amount values temporarily stored in the memory 152 in association with each group. Further, the CPU 151 reads out the relative angle coefficient $\beta$ and the distance coefficient $\alpha$ which are stored in advance in the memory 152 in association with the corresponding group. First, the CPU 151 subjects the three original light amount values to weighted combining through use of the relative angle coefficient $\beta$ to calculate the original group light amount value. Further, the CPU 151 multiplies the original group light amount value by the distance coefficient $\alpha$ to calculate the normalized group light amount value (Step S10).

Next, the CPU 151 corresponding to the computing unit calculates the total sum value or the average value of the group light amount values calculated as described above (Step S11). The CPU 151 determines whether or not this total sum value or average value falls within a reference range (Step S12). When the total sum value or the average value falls within the reference range, the CPU 151 starts the therapy mode, and notifies a user that the therapy is in progress through use of the display device 180 or the speaker 190. Further, the CPU 151 transmits, to the light emission control unit 160, a command to cause all of the light emitting element substrates 111 of the light emitting units 112 and 112 to emit light, to thereby start the therapy (Step S13). On the other hand, when the total sum value or the average value is outside of the reference range, the CPU 151 outputs a notification of an error through use of the display device 180 or the speaker 190 without starting the therapy (Step S14).

When the display device 180 includes a display panel, in Step S13, the CPU 151 may cause the display panel to display an indication showing that the therapy is in progress, or in Step S14, the CPU 151 may cause the display panel to display an indication of error occurrence. When the display device 180 includes a normality lamp 181 and an abnormality lamp 182, in Step S13, the CPU 151 may turn on the normality lamp 181, and in Step S14, the CPU 151 may turn on the abnormality lamp 182.

According to the photodynamic therapy device 100 described above, even when a part of the light sources 110 of the light emitting units 112 and 112 has a light amount change, the change can be appropriately detected, and the photodynamic therapy can be appropriately performed. That is, even when, while the entire light emitting units 112 and 112 are caused to emit light, the light amount thereof is attempted to be detected by the photodetectors 120X and 120Y, among the light sources 110 included in the light emitting units 112 and 112, the light sources 110 at places close to the photodetectors 120X and 120Y cause a relatively strong effect. Thus, even when the light sources 110 at places far from the photodetectors 120X and 120Y have a light amount change, the change cannot be appropriately detected. In contrast, in this embodiment, the light sources 110 included in the light emitting units 112 and 112 are grouped in accordance with the distance from the photodetector 120X or 120Y, and the light sources 110 are caused to emit light for each group. Then, the light amount is measured by the photodetector 120X or 120Y for each group so that the original group light amount value is obtained. Further, the original group light amount value of each group is normalized through use of the above-mentioned distance coefficient $\alpha$, and the sum or the average value of the original group light amount values is set as the total light amount value of the entire light emitting units 112 and 112. This total light amount value sufficiently reflects even the amount of light emitted from the light sources 110 at places far from the photodetectors 120X and 120Y. Thus, through determination on whether or not the total light amount value falls within the reference range, the light amount change of such far light sources 110 can be appropriately detected. Further, as compared to the related art, the number of photodetectors 120X and 120Y can be reduced, and it is not required to scan the photodetectors 120X and 120Y with respect to the light emitting units 112 and 112. Thus, a compact photodynamic therapy device 100 can be achieved.

Further, the specific configurations described in this embodiment are described as examples, and are not intended to limit the technical scope of the present invention to this embodiment. Various modifications may be made by a person skilled in the art to those disclosed embodiments. It is to be understood that the technical scope of the invention disclosed herein cover all such modifications.

For example, in the description above, two light emitting units 112 and 112 are provided so as to sandwich the cartridge 10 from the right and left sides, but the number of light emitting units 112 may be one, or three or more. Further, in the description above, the photodynamic therapy device 100 includes two upper and lower photodetectors 120X and 120Y so that the amount of light emitted from each light emitting element substrate 111 is measured by any one of the photodetectors 120X and 120Y. However, the photodynamic therapy device 100 may include only one of the photodetectors 120X and 120Y so that the amount of light emitted from each light emitting element substrate 111 is measured by the one photodetector.

Further, in the description above, each of the photodetectors 120X and 120Y includes the photodetection elements 121F, 121C, and 121B, and the three original light amount values obtained by those photodetection elements are subjected to weighted combining so that the original group light amount value is calculated. However, the photodetectors 120X or 120Y may include two photodetection elements or four or more photodetection elements, and a plurality of original light amount values acquired by those photodetection elements may be subjected to weighted combining so that the original group light amount value is calculated. As another example, the photodetectors 120X or 120Y may include only one photodetection element, and the original light amount value acquired by the photodetection element may be directly used as the original group light amount value.

Further, in the description above, the light sources 110 mounted on the light emitting element substrates 111 at the same height are assumed to belong to the same group, but the way of grouping is not limited thereto. For example, a plurality of light sources 110 are mounted in matrix on the light emitting element substrate 111, and hence, among the light sources 110 mounted on the light emitting element substrate 111, only the light sources 110 arrayed in the row direction may be assumed to belong to one group. In this case, when there is another light emitting element substrate 111 at the same height, among the light sources mounted on the another light emitting element substrate 111, the light sources 110 arrayed in the row direction at the same height may be assumed to belong to the same group. Further, each light source 110 may be formed of a plurality of light emitting elements.

Further, in the description above, when the total light amount value is outside of the reference range, the therapy is not started as an error, but the light amount of the light emitting units 112 and 112 may be adjusted so that the total light amount value is brought to fall within the reference range. For example, when the power supply voltage is supplied to one or more light emitting element substrates 111, the duty ratio of the power supply voltage can be adjusted so that the total light amount value is brought to fall within the reference range.

Further, the group light amount value and the total light amount are output in units of output signals of the photodetectors 120X and 120Y, but the group light amount value and the total light amount may each be multiplied by a predetermined conversion coefficient so as to be converted into a general unit indicating brightness of a light source, such as lux, lumen, or candela. As another example, the distance coefficient α or the relative angle coefficient β may include such a conversion coefficient for conversion into a general unit.

REFERENCE SIGNS LIST 4 patient, 5 tumor cell, 6 blood circuit, 7 irradiation blood circuit, 8 extracorporeal circulation pump, 10 cartridge, 20 winding core, 30 tube, 50 casing, 100 photodynamic therapy device, 110 light source, 111-1~111-9 light emitting element substrate, 112 light emitting unit, 120X, 120Y photodetector, 121F, 121C, 121B photodetection element, 130 A/D conversion circuit, 150 control unit, 151 CPU, 152 memory, 160 light emission control unit, 170 power supply device, 180 display device, 190 speaker.

The invention claimed is:

1. A photodynamic therapy device, comprising:
a light emitting unit including a plurality of light sources each belonging to any one of a plurality of groups;
a photodetector configured to output an electrical signal corresponding to an amount of light received from the plurality of light sources;
a light emission control unit configured to sequentially cause the plurality of light sources to emit light for each group; and
a computing unit configured to calculate, based on a distance coefficient related to a distance between the photodetector and one or more of the plurality of light sources belonging to the each group, and on a value of the electrical signal output by the photodetector in accordance with light emitted from the one or more of the plurality of light sources belonging to the each group, a group light amount value related to a light amount of the plurality of light sources belonging to the each group,
wherein a ratio of a first group light amount value of one of the groups to a second group light amount value of another one of the groups is set as the distance coefficient of said another one of the groups, and
wherein the computing unit is further configured to control the plurality of light sources to emit light in response to the group light amount value satisfying a reference condition, to thereby perform photodynamic therapy on a treatment target.

2. The photodynamic therapy device according to claim 1, wherein the each group is arranged in each different region.

3. The photodynamic therapy device according to claim 2, wherein regions in each of which the each group is arranged are arrayed in a detecting direction of the photodetector.

4. The photodynamic therapy device according to claim 3, wherein a plurality of light sources arrayed in an intersecting direction intersecting with the detecting direction belong to the each group.

5. The photodynamic therapy device according to claim 4,
wherein the photodetector includes a plurality of photodetection elements arranged so as to be spaced apart from each other in the intersecting direction, and
wherein the computing unit is configured to calculate the group light amount value further based on a relative angle coefficient related to a relative angle of the plurality of light sources belonging to the each group with respect to a detecting direction of each of the plurality of photodetection elements.

6. The photodynamic therapy device according to claim 5,
wherein the photodetector includes a first photodetector and a second photodetector which are arranged so as to face each other in a detecting direction of each of the first photodetector and the second photodetector, and
wherein the light emitted from the one or more of the plurality of light sources belonging to the each group is received by one of the first photodetector and the second photodetector which is arranged farther therefrom so that the electrical signal is output.

7. The photodynamic therapy device according to claim 5, wherein the computing unit is configured to calculate a sum or an average value of the group light amount values relating to the plurality of groups, respectively, as a value related to a total light amount of the light emitting unit.

8. The photodynamic therapy device according to claim 4,
wherein the photodetector includes a first photodetector and a second photodetector which are arranged so as to face each other in a detecting direction of each of the first photodetector and the second photodetector, and
wherein the light emitted from the one or more of the plurality of light sources belonging to the each group is received by one of the first photodetector and the second photodetector which is arranged farther therefrom so that the electrical signal is output.

9. The photodynamic therapy device according to claim 4, wherein the computing unit is configured to calculate a sum or an average value of the group light amount values relating to the plurality of groups, respectively, as a value related to a total light amount of the light emitting unit.

10. The photodynamic therapy device according to claim 3,
wherein the photodetector includes a first photodetector and a second photodetector which are arranged so as to face each other in a detecting direction of each of the first photodetector and the second photodetector, and
wherein the light emitted from the one or more of the plurality of light sources belonging to the each group is received by one of the first photodetector and the second photodetector which is arranged farther therefrom so that the electrical signal is output.

11. The photodynamic therapy device according to claim 3, wherein the computing unit is configured to calculate a sum or an average value of the group light amount values relating to the plurality of groups, respectively, as a value related to a total light amount of the light emitting unit.

12. The photodynamic therapy device according to claim 2,
wherein the photodetector includes a first photodetector and a second photodetector which are arranged so as to face each other in a detecting direction of each of the first photodetector and the second photodetector, and
wherein the light emitted from the one or more of the plurality of light sources belonging to the each group is received by one of the first photodetector and the second photodetector which is arranged farther therefrom so that the electrical signal is output.

13. The photodynamic therapy device according to claim 2, wherein the computing unit is configured to calculate a sum or an average value of the group light amount values relating to the plurality of groups, respectively, as a value related to a total light amount of the light emitting unit.

14. The photodynamic therapy device according to claim 1,
wherein the photodetector includes a first photodetector and a second photodetector which are arranged so as to face each other in a detecting direction of each of the first photodetector and the second photodetector, and
wherein the light emitted from the plurality of light sources belonging to the each group is received by one of the first photodetector and the second photodetector which is arranged farther therefrom so that the electrical signal is output.

15. The photodynamic therapy device according to claim 14, wherein the computing unit is configured to calculate a sum or an average value of the group light amount values relating to the plurality of groups, respectively, as a value related to a total light amount of the light emitting unit.

16. The photodynamic therapy device according to claim 1, wherein the computing unit is configured to calculate a sum or an average value of the group light amount values relating to the plurality of groups, respectively, as a value related to a total light amount of the light emitting unit.

17. The photodynamic therapy device according to claim 16, wherein the computing unit is configured to adjust, when the value related to the total light amount is outside of a reference range, a light amount of one or more of the light sources belonging to at least one of the plurality of groups.

18. The photodynamic therapy device according to claim 16, wherein the computing unit is configured to output a notification of an error when the value related to the total light amount is outside of a reference range.

* * * * *